United States Patent [19]

Malghan et al.

[11] Patent Number: 5,039,550
[45] Date of Patent: Aug. 13, 1991

[54] COLLOIDAL PROCESSING METHOD FOR COATING CERAMIC REINFORCING AGENTS

[75] Inventors: Subhas G. Malghan, Gaithersburg, Md.; Claudia P. Ostertag, Washington, D.C.

[73] Assignee: The United States of America as represented by the Secretary of Commerce, Washington, D.C.

[21] Appl. No.: 468,652

[22] Filed: Jan. 23, 1990

[51] Int. Cl.$^5$ ............................................. B05D 3/12
[52] U.S. Cl. .................................... 427/57; 427/214; 427/215; 427/299; 427/419.2; 427/428
[58] Field of Search ................ 427/190, 213.3, 213.31, 427/214, 13, 215, 57, 299, 419.2, 428, 430.1, 304, 309; 428/279

[56]  References Cited
U.S. PATENT DOCUMENTS

| | | |
|---|---|---|
| 2,128,613 | 8/1938 | Kling et al. . |
| 2,173,243 | 9/1939 | Young . |
| 3,684,572 | 8/1972 | Taylor .................................. 427/306 |
| 3,758,317 | 9/1973 | Moore et al. . |
| 3,775,141 | 11/1973 | Weidman . |
| 3,849,181 | 11/1974 | Green . |
| 4,081,576 | 3/1978 | Hensel et al. . |
| 4,353,934 | 10/1982 | Nakashima et al. . |
| 4,478,883 | 10/1984 | Bupp et al. ............................ 427/97 |
| 4,801,476 | 1/1989 | Dunsmuir et al. . |
| 4,832,988 | 5/1989 | Bogenschutz et al. ............. 427/309 |
| 4,921,721 | 5/1990 | Morsui et al. ....................... 427/309 |
| 4,940,609 | 7/1990 | Tschang et al. .................... 427/304 |

OTHER PUBLICATIONS

Ostertag et al. (Jul. 1989) in "Composites and Advanced Ceramic Materials".

Primary Examiner—Shrive Beck
Assistant Examiner—Benjamin L. Utech
Attorney, Agent, or Firm—Stephanie Seidman

[57] ABSTRACT

This invention provides an improved method for coating reinforcing agents that are used in fiber reinforced ceramic composites and other composite materials. In the first step of this method the reinforcing agent is surface cleaned. The cleaned reinforcing agent is then dipped into a solution of a surfactant and uniformly coated therewith, whereby a positive charge is imparted to the agent. The charged agent is then dipped into a suspension of the coating material, such as alumina powder. The suspension of the coating material is prepared by dispersing the particles using ultrasonification and a dispersant, such as polyacrylate. The pH of the suspension is adjusted so that the dispersant is ionized and can adsorb on the particulate coating material. After dipping the reinforcing agent into the suspension, the reinforcing agent is dried. The steps of the method, except for the cleaning step, are repeated until a coating having a desired thickness is formed.

14 Claims, No Drawings

COLLOIDAL PROCESSING METHOD FOR COATING CERAMIC REINFORCING AGENTS

BACKGROUND OF THE INVENTION

1. Technical Field

The present invention is related generally to a method for coating or processing reinforcing agents, such as stiff fibers, that are used to increase the toughness of brittle materials, such as ceramics and inorganic glasses and other materials that exhibit the high temperature properties, such as high strength and low ductility, of ceramics. More particularly, the present invention is related to a new method for coating reinforcing agents, to the coated reinforcing agents produced by said method, and to composite materials that contain said coated reinforcing agents.

2. State of the Art

Ceramics and other brittle materials, such as inorganic glasses, retain strength and low ductility at high temperatures but exhibit low toughness, i.e., resistance to crack propagation. Although they exhibit high strength, it is readily lost through surface damage. Reinforcing agents can be added to such materials in order to increase the toughness of such materials. The introduction of a reinforcing agent into a ceramic or other brittle material produces a composite material, which consists of the reinforcing agent and a matrix of the brittle material. The composite material has the desirable properties, such as strength at high temperatures of the unreinforced material, but has greatly increased toughness compared to the unreinforced material These advantageous properties of reinforced materials, such as toughness and strength at high temperature, can be lost, however, if the reinforcing agent reacts chemically with the matrix or with the environment. Coating the reinforcing agent with a suitable material, such as alumina, minimizes reactions of the agent with the matrix and/or with the environment during processing and use of the material.

Fiber reinforced ceramics consist of a ceramic, glass-ceramic, inorganic-glass or other brittle matrix that is reinforced with a fiber or other agent, such as a whisker or platelet. Typical reinforcing agents consist of high modulus carbon, silicon carbide, silicon carbide deposited on carbon filament, α-alumina, alumina-borosilicate, boron, tungsten, and niobium stainless steel (see, e.g., Phillips (1983) at pp. 373-428 of Handbook of Composites, vol. 4, Ed. Kelly et al. Elsvier Science Publishers, B.V.).

Numerous processes exist for the fabrication of fiber reinforced ceramic composites. These processes generally involve two stages: incorporation of the fibers into the unconsolidated matrix and consolidation of the matrix. Hot-pressing is the most widely used technique for preparing fiber reinforced ceramic composites. Hot-pressing achieves full density and good mechanical properties in the resulting composite. Complex shapes, however, cannot be readily fabricated by hot-pressing. As an alternative, pressureless sintering is often used for fabricating near-net-shape components. This method is, however, impeded by the stress generation that is caused by differential shrinkage between the ceramic matrix and the reinforcing agents.

In situ observations of the sintering process for composites of silicon carbide fibers (hereinafter SiC$_f$) in an alumina matrix reveal that these stresses initiate during the heating cycle before the actual sintering temperature of 1450° C. is reached (see, e.g., Ostertag, C.P. (1987) J. Am. Cer. Soc. 70 (12): C355). Because of the low matrix density and consequent low matrix strength at the point of stress initiation, stresses that develop during the early stage of sintering are found to be the most detrimental to achieving a damage-free composite (see, e.g. Ostertag, C.P. (1989) in Sintering of Adv. Ceram., Ceram. Trans., ed. by C. N. Handwerker et al., Am. Ceram. Soc.). Therefore, it is necessary to delay stress development until the matrix density is sufficiently high to withstand the stresses associated with the reinforcing fibers. There is, thus, a need to develop processing routes that delay stress generation during the early stages of sintering, specifically during the heating cycle.

The fiber reinforced ceramic composite that is produced by the addition of a fiber component to a ceramic matrix offers enhanced fracture toughness and strength. The toughening of the fiber reinforced ceramic composite occurs because of an increase in the fracture energy of the reinforced ceramic matrix compared to that of the corresponding monolithic matrix. Further, crack deflection around the fiber increases the stress that is required to break the material and/or increases the amount of energy that is needed to pull the fiber from the surrounding matrix. This in turn increases flaw tolerance in the fiber reinforced ceramic composite, which results in graceful failure thereof.

In a fiber reinforced ceramic composite there exist three layers of materials: the fiber, the interface at the fiber and matrix, and the matrix. The interface at the fiber and the matrix plays an important role in imparting toughness to the composite material because the chemical and physical properties of the interface affect the thermodynamics and kinetics of the reactions of the overall composite system. Coating the reinforcing agent with an appropriate material can be used to minimize reactions between the agent and the matrix and/or the environment during processing and use. According to Kerans et al. (in the Ceramic Bulletin, Vol. 68, No. 2, 1989) the fracture toughness and strength increases of the composite are a direct consequence of fiber reinforcements that have a higher modulus and strength than the matrix. This increase in fracture toughness and strength can only be realized, however, if the interface is able to transfer load from the matrix to the reinforcing fiber.

Thus, optimization of the mechanical properties of the interface has become a key factor in developing reinforced composite materials, such as fiber reinforced ceramic composites. The interface must have properties that maximize the fracture strength and toughness of the composite. Since the choices of fiber and matrix are limited, optimization of the mechanical properties is achieved by the methods used to coat or process the fibers or other reinforcing agents. Several methods have been developed and are currently being used for coating reinforcing agents. These methods include slurry formation followed by fusing, sol-gel, chemical vapor deposition and thermal spraying (see, e.g., Schmid et al. (1988) Ceram. Eng. Sci. Proc. 9 (9-10): 1089-94). None of these methods, however, permit sufficient control of interface chemistry to optimize the mechanical properties thereof.

There is, thus, not only a need to develop processing routes that delay stress generation during the early stages of sintering, but a need to develop coating and processing methods that permit the control of interface chemistry and thereby improve the strength and toughness of the composite material.

SUMMARY OF THE INVENTION

It is one object of this invention to provide a colloidal processing method for coating a silicon carbide reinforcing agent with a coating having selected thickness, comprising (a) contacting said agent with an aqueous suspension of a quaternary amine surfactant, whereby a positive surface charge is imparted to said material; (b) contacting said positively charged agent with homogeneous uniformly dispersed suspension of negatively charged particles of alumina, whereby said negatively charged particles bind to said positively charged material completely and uniformly coat said agent; (c) drying said uniformly coated agent; and (d) repeating steps (a)–(c) a plurality of times until said coating has the selected thickness, wherein said suspension of alumina is prepared prior to use and is then treated by successive steps, comprising adjusting the pH of the suspension to about 11, ultrasonicating said suspension; adding a polyacrylate dispersant, and ultrasonicating the mixture negatively charged alumina particles and dispersant, whereby the negative charge of said particles is enhanced and said suspension is uniformly dispersed.

It is another object of this invention to provide a method for preparing a homogeneous uniformly dispersed suspension of negatively charged particles for use in the colloidal processing method, comprising ultrasonicating a suspension of said negatively charged particles; adding a dispersant, adjusting the pH of the suspension to a pH such that said dispersant is substantially ionized, and ultrasonicating the mixture of charged particles and dispersant, whereby the negative charge of said particles is enhanced and said suspension is uniformly dispersed.

In accordance with this invention there is provided a colloidal processing method for coating particulate or fibrous material with a coating having a selected thickness, comprising (a) contacting said material with a suspension of a quaternary amine surfactant, whereby a positive surface charge is imparted to said material; (b) contacting said positively charged material with a homogeneous uniformly dispersed suspension of negatively charged particles, whereby said negatively charged particles bind to said positively charged material and completely and uniformly coat said material; (c) drying said uniformly coated material; and (d) repeating steps (a)–(c) a plurality of times until said coating has the selected thickness.

This invention also provides significantly improved coated reinforcing agents, such as silicon carbide fibers, which, when mixed with a matrix material, provide a matrix fiber interface that has improved mechanical properties, so that the coated fibers can be used in sintered composite materials.

This invention also provides fiber reinforced ceramic composites that are prepared using the coated reinforcing agents of this invention and that exhibit a high degree of stress resistance during sintering and that results in a fiber reinforced composite material that has high strength and toughness.

DESCRIPTION OF THE PREFERRED EMBODIMENTS

Unless defined otherwise, all technical and scientific terms used herein have the same meaning as is commonly understood by one of ordinary skill in the art to which this invention belongs. Although methods and materials similar or equivalent to those described herein can be used in the practice of testing of the present invention, the preferred methods and materials are now described. All publications mentioned hereunder are incorporated by reference.

As used herein, a fiber reinforced ceramic composite includes but is not limited to ceramics, inorganic glasses and other brittle materials known to those of skill in that art that exhibit the high strength at high temperatures and low ductility of ceramics, that are reinforced with stiff fibers, whiskers, platelets or other particulate reinforcing agent. The ceramic composites of this invention are prepared by mixing a suitable matrix material with the reinforcing agent and then preparing a ceramic therefrom by standard methods, such as hot pressing and sintering of the pressed composite material.

As used herein, a reinforcing agent is intended to include any agent that is used to reinforce ceramics to produce fiber reinforced ceramic composites.

As used herein, a fiber is intended to include, but is not limited to any particulate material of any shape that is used to reinforce ceramics and other brittle materials.

As used herein, toughness refers to the tendency of a ceramic to resist crack formation.

In the invention disclosed herein a colloidal processing method for coating reinforcing agents with a suitable material that enhances the strength and toughness of a composite material formed with said agent and for controlling the coating thickness has been developed. The method of this invention can be used to coat any type of coarse particle with any type of fine particle for any purpose in which surface protection is required. In the preferred embodiments of this invention reinforcing agents that will be used to reinforce a composite are coated in order to improve the mechanical properties of the agent/ceramic matrix interface into which they are incorporated.

The method of this invention provides several unique and advantageous features. Among these are the nearly complete dispersion of suspensions of particles, such as alumina, that are used to coat the reinforcing agent and an enhanced negative charge and increased size range of these particles. Complete dispersion of the particles leads to a coating of uniformly packed particles, which enhances sintering uniformity. The production of an enhanced charge on the reinforcing agent in turn promotes adsorption thereto, improves the ability to control coating thickness, and provides the ability to produce relatively thick coatings. Another advantage that is inherent in the method of this invention is that it is independent of the chemistry of the particular coating material and reinforcing agent so that any type of reinforcing agent can be coated with any coating material. Finally, by permitting any reinforcing agent to be coated with any agent, a means is provided whereby the bonding strength between the reinforcing agent and the matrix can be modified.

In a typical procedure using the methods of this invention a reinforcing agent is coated by colloidal processing. The reinforcing agent can be, but is not limited to, $SiC_f$, SiC platelets, SiC whiskers or any coarse particulate material known to those of skill in the art to be suitable for use as a reinforcing agent. The coating can be $Al_2O_3$, $Si_3N_4$, $ZrO_2$ or any other suitable relatively finely-sized particulate material known to those of skill in the art. In the first step of the method of this invention the fibers are surface cleaned by washing with agents such as organic solvents, strong acids, strong bases and combinations thereof.

In the second step a strong positive surface charge is imparted to the reinforcing agent by dipping it into an aqueous suspension of a polymerized quaternary amine or other surfactant that will adsorb to the surface of the agent and thereby impart a positive charge. Adsorption of the positively charged surfactant, such as a quaternary amine, on the reinforcing agent results in a strongly positive surface.

In the third step of the method the coated, positively charged reinforcing agent from step two is dipped into a homogeneous suspension of the selected particulate coating material, such as alumina. Alternatively, the reinforcing agent can be tumbled gently in the presence of a homogeneous suspension of the particulate to be coated. The homogeneous aqueous suspension of the selected particulate coating material, such as alumina, is prepared by suspending the particulate material and dispersing the suspension. Dispersion can be accomplished using any means known to those of skill in the art, such as ultrasonification or any other means which uniformly disperses the particles in the suspension. After dispersion, a surfactant, such as a polyacrylate dispersant, can be added to the suspension in order to enhance the electrosteric charge on the particles and to provide for enhanced stability of the dispersed suspension. The pH of the suspension is adjusted such that the dispersant is substantially ionized. Upon dipping the positively charged reinforcing agent from step two into the dispersed suspension, the suspension is periodically agitated in order to provide a uniform coating on the reinforcing agent. The coated reinforcing agent is then dried by any suitable means known to those of skill in the art, such as drying in a vacuum oven. The dried coated reinforcing agent is cooled to room temperature and the method, starting at step two, is repeated a plurality of times until the coating has the desired thickness.

The coated agent can then be mixed with a ceramic matrix material or other brittle material and a reinforced composite material can be prepared using methods, such as hot pressing, known to those skilled in the art. The reinforced composite material exhibits high stress resistance during subsequent sintering, which produces a reinforced ceramic or other composite that exhibits high strength and toughness.

In one embodiment of this invention silicon carbide fibers, such as those which are made by AVCO Corp. using a chemical deposition process and which have an average diameter of 140 microns, are cut to a size suitable for processing, and subjected to surface cleaning in order to remove any oil, dirt or other extraneous surface material. Silicon carbide fibers are readily available to those of skill in the art any that are known can be used in practicing this invention. Surface cleaning is effected by dipping and agitating the fibers in an organic solvent, such as acetone or trichloroethylene. After agitation the fibers are removed and are alternately washed for a sufficient time in nitric acid (0.01N) and ammonium hydroxide (0.1N). The alternate acid and base washes are repeated a sufficient number of times to remove any surface oil, dirt, or other material. Generally, three washing periods of 10 minutes are sufficient. After the final wash the fibers are washed with distilled water and dried at a temperature and for a time sufficient to ensure that the cleaned fibers are dry. For example, overnight drying in a vacuum oven at a temperature of 150°-160° C. is sufficient.

The surface cleaned fibers are immersed or rolled in a quaternary amine (Betz 1190, 1192, or 1194) solution in water for a time sufficient to in order to impart a uniform positive charge to the fibers. The surfactant solution is prepared in distilled water at a concentration of about 5 to 25% by weight. The fibers are rolled in the solution in order to get them uniformly coated and to remove air bubbles.

Alumina powder (Sumitomo AKP-50 or AKP-15) is mixed with distilled water that contains $NH_4OH$ at a pH that is sufficiently high to ensure that the dispersant that is subsequently added to the alumina suspension will be substantially ionized. One having skill in the art can determine this pH by routine experimentation. Generally, depending upon the dispersant used, a pH of about 11 is suitable. Sumitomo AKP-15 has a $d_{50}=0.25$ microns and AKP-50 has a $d_{50}=0.75$ microns. The alumina powder is added to water at concentrations varying between about 10 and 50% by weight. The selected concentration depends upon the thickness of the coating that is desired. The thickness of the coating depends not only upon the concentration of alumina powder in the suspension but also upon the concentration of surfactant used in step two and the number of times the entire process is repeated.

The suspension is ultrasonicated and a polyacrylate dispersant, such as Dow XFS-4272 (molecular weight about 8000), or other suitable dispersant is added to the alumina suspension at a concentration of about 0.1% by weight of alumina powder. The suspension is ultrasonicated using about 150 watts of power input per 100 ml. of suspension. Excess heat generation is controlled by cooling and by applying the ultrasonic power periodically rather than continuously.

After addition of the dispersant, the suspension is again ultrasonicated, as described above, in order to achieve complete deagglomeration of the powder and to impart a negative charge on the alumina particles. Typically this can be achieved by ultrasonicating at 5 minute on and 5 minute off intervals for a total period of 15 minutes. The polyacrylate dispersant, which is primarily in ionic form at the pH of the solution, adsorbs on the alumina particles by hydrogen bonding between surface $OH_2^+$ sites and carboxyl groups on the surfactant.

The positively charged $SiC_f$ are immersed and rolled in the surfactant-alumina suspension for a time sufficient, generally about 5 minutes, to uniformly coat the $SiC_f$ with the alumina particles. The coated fibers are then dried in a vacuum oven. The process, except for the initial cleaning step, is then repeated until the coating has the desired thickness.

The coated $SiC_f$ are then used to prepare a fiber reinforced ceramic composite by sandwiching a layer of the coated $SiC_f$ between two layers of alumina powder, cold pressing and then sintering the layered mixture.

The following examples are included for illustrative purposes only and are not intended to limit the scope of the invention.

EXAMPLE 1

Silicon carbide fibers, which are made by AVCO Corp. using a chemical deposition process and which have an average diameter of 140μ, were cut to a size 3.4 cm. long and subjected to surface cleaning in order to remove any oil, dirt or other extraneous surface material. Surface cleaning was effected by dipping the fibers in acetone followed by 15-30 minutes of agitation. After which the fibers were removed and alternately washed for 10 minutes in nitric acid (0.01N) and ammonium hydroxide (0.1N). Three washing periods of 10 minutes were used. After the final wash the fibers were washed with distilled water and dried overnight in a vacuum oven at 150°-160° C.

The surface cleaned fibers were immersed for 2-5 minutes and rolled in a quaternary amine (Betz 1190, 1192, or 1194) surfactant solution, which was prepared in distilled water at a concentration of 5% by weight in order to impart a positive charge to the fibers. The fibers were rolled in the solution in order to get them uniformly coated and to remove air bubbles.

Alumina powder (Sumitomo AKP-50), which has an average particle size of o. 75 $\mu$ was mixed with distilled water that contained $NH_4OH$ at a pH of 11.0. The alumina powder was added to water at concentrations of 20% by weight. The suspension of alumina was ultrasonicated using about 150 watts of power input per 100 ml. of suspension. Excess heat generation was controlled by cooling and by applying the ultrasonic power periodically rather than continuously.

A polyacrylate dispersant, such as Dow XFS-4272 (molecular weight about 8000), was added to the alumina suspension at a concentration of about 0.1% by weight of alumina powder. After addition of the polyacrylate, the suspension was again ultrasonicated, as described above, in order to completely deagglomerate the powder and to impart a negative charge on the constituent particles. This was achieved by ultrasonicating at 5 minute on and 5 minute off intervals for a total period of 15 minutes. The polyacrylate dispersant, which is primarily in ionic form at the pH of the solution (7.9), adsorbed on the alumina particles by hydrogen bonding between surface $OH_2^+$ sites and carboxyl groups on the dispersant.

The positively charged $SiC_f$ were immersed and rolled in the surfactant-alumina suspension for about 5 minutes and were thereby uniformly coated with the alumina particles. The coated fibers were then dried in a vacuum oven.

The process, except for the cleaning step, was repeated 25 times after which each fiber had a uniform a coating about 10 microns thick.

EXAMPLE 2

Silicon carbide fibers, which are made by AVCO Corp., were coated as in Example 1 except that the concentration of quaternary amine in the first dipping step was 25%, the concentration of alumina in suspension was 50% The process, except for the cleaning step, was repeated 15 times after which each fiber had a uniform coating about 50 microns thick.

EXAMPLE 3

Fibers were coated as in Example 3, except that the number of times the process was repeated was varied. It was found that the thickness of the coating that is formed varied linearly with the number of times the process was repeated.

EXAMPLE 4

Model ceramic composites were fabricated by dry pressing follow by sintering using $SiC_f$ that have been coated as in Example 1 or using uncoated $SiC_f$. The thickness of the coating was adjusted by the number of iterations. In addition, different size alumina particles were used. Fibers having coatings having thicknesses of about 4 microns to about 16 microns were prepared using different size alumina particles. The size of the alumina particles were either fine, $d_{50}=0.25$ micron, or coarse, $d_{50}=0.75$ micron. The coatings were fairly dense and uniform.

Model ceramics were prepared. AKP-50 alumina powder was spray dried and used as a matrix material. The $SiC_f$, either coated, as described above, or uncoated was sandwiched between two layers of alumina. The resulting ceramic composite (40% theoretical density), which was formed by dry pressing, was then sintered and used as a model to study the effects of coating the $SiC_f$ on sintering stresses.

The model ceramics containing a layer of fibers were prepared and the stresses that developed during sintering were observed as a function of bending and temperature of initiation of bending. The model ceramics were prepared by sandwiching the fibers between layers of the alumina matrix. Each layer had a different thickness so that stresses that developed during sintering could be measured by measuring the bending of the fiber plane.

The strongest bending was observed for ceramics that contained fibers having a 16 micron coating that was prepared from the finely grained alumina particles. The bending initiated at 1200° C., which temperature is reached at an early stage in the sintering process. On the other hand, the least amount of bending was observed in the ceramics that were prepared with fibers that had a 10 micron coating that was prepared from the coarsely grained alumina particles. In addition, bending was retarded and did not occur until the temperature reached 1325° C.

Since modifications will be apparent to those of skill in the art, it is intended that this invention be limited only by the scope of the appended claims.

We claim:

1. A colloidal processing method for completely and uniformly coating particulate or fibrous materials, wherein said coating has a selected thickness, said method comprising:
   (a) contacting said material with a mixture of a quaternary amine surfactant and water, whereby a positive surface charge is imparted to said material;
   (b) contacting said positively charged material with a homogeneous uniformly dispersed suspension of negatively charged particles, whereby said negatively charged particles bind to said positively charged material and completely and uniformly coat said material;
   (c) drying said material to form a uniform and complete coating of said particles; and
   (d) repeating steps (a)-(c) a plurality of times until said coating has the selected thickness and said material is suitable for use as a reinforcing agent to increase the toughness of brittle materials.

2. The method of claim 1, wherein said negatively charged particles are selected from the group consisting of $Al_2O_3$ particles, $Si_3N_4$ particles and $ZrO_2$ particles.

3. The method of claim 1, wherein said material is selected from the group consisting of silicon carbide fibers, silicon carbide whiskers, and silicon carbide platelets.

4. The method of claim 3, wherein said negatively charged particles are selected from the group consisting of $Al_2O_3$ particles, $Si_3N_4$ particles and $ZrO_2$ particles.

5. The method of claim 1, wherein said method further comprises cleaning said material prior to step (a).

6. The method of claim 5, wherein said cleaning is effected by successively washing said material with an effective amount of an organic solvent, an effective concentration of an inorganic acid solution, an effective concentration of inorganic basic solution, wherein said effective amount and concentrations are effective to remove surface oil, dirt and or other material from said surface without damaging or altering said surface.

7. The method of claim 1, wherein said homogeneous uniformly dispersed suspension of negatively charged particles is prepared prior to use by a method, comprising: ultrasonicating said suspension; adding a dispersant to said ultrasonicated suspension, adjusting the pH of the suspension to a pH such that said dispersant is substantially ionized, and ultrasonicating the mixture of said negatively charged particles and dispersant, whereby the negative charge of said particles is enhanced and said suspension is uniformly dispersed.

8. The method of claim 7, wherein said dispersant is a polyacrylate dispersant.

9. A method for coating a silicon carbide reinforcing agent with a coating having a selected thickness, comprising:
   (a) contacting said agent with a mixture of a quaternary amine surfactant and water, whereby a positive surface charge is imparted to said agent;
   (b) contacting said positively charged agent with a homogeneous uniformly dispersed suspension of negatively charged particles of alumina, whereby said negatively charged particles bind to said positively charged material and thereby completely and uniformly coat said agent;
   (c) drying said uniformly coated agent; and
   (d) repeating steps (a)-(c) a plurality of times until said coating has the selected thickness.

10. The method of claim 9, wherein said silicon carbide reinforcing agent is cleaned prior to step (a) by successively washing it with an effective amount of acetone or trichloroethylene, an effective concentration of ammonium hydroxide solution, and an effective concentration of nitric acid, wherein said effective amount and concentrations are effective to remove surface oil, dirt and other surface material from said surface without damaging or altering said surface.

11. The method of claim 10, wherein said suspension of alumina is prepared prior to use and then treated by successive steps, comprising adjusting the pH of the suspension to about 11, ultrasonicating said suspension; adding a polyacrylate dispersant, and ultrasonicating the mixture of charged particles and dispersant, whereby the negative charge of said particles is enhanced and said suspension is uniformly dispersed.

12. The method of claim 11, wherein said contacting steps are effected by dipping or rolling.

13. The method of claim 11, wherein said silicon carbide reinforcing agent is selected from the group consisting of silicon carbide fibers, silicon carbide whiskers, and silicon carbide platelets.

14. The method of claim 11, wherein said alumina particles have an average size ranging from about 0.2 micron to about 1.0 micron.

* * * * *